(12) United States Patent
Kawash et al.

(10) Patent No.: US 12,100,292 B2
(45) Date of Patent: *Sep. 24, 2024

(54) SYSTEM AND METHOD FOR TRACKING A PASSIVE WAND AND ACTUATING AN EFFECT BASED ON A DETECTED WAND PATH

(71) Applicant: Universal City Studios LLC, Orlando, FL (US)

(72) Inventors: Sameer Kawash, Orlando, FL (US); Justin Michael Schwartz, Orlando, FL (US); Steven C Blum, Orlando, FL (US)

(73) Assignee: Universal City Studios LLC, Orlando, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/808,453

(22) Filed: Jun. 23, 2022

(65) Prior Publication Data

US 2023/0050566 A1 Feb. 16, 2023

Related U.S. Application Data

(63) Continuation of application No. 16/915,955, filed on Jun. 29, 2020, now Pat. No. 11,373,516, which is a
(Continued)

(51) Int. Cl.
*G08C 17/02* (2006.01)
*A63G 31/00* (2006.01)
(Continued)

(52) U.S. Cl.
CPC ............. *G08C 17/02* (2013.01); *A63G 31/00* (2013.01); *A63H 30/04* (2013.01); *A63J 21/00* (2013.01);
(Continued)

(58) Field of Classification Search
CPC ........ G08C 17/02; A63G 31/00; A63H 30/04; A63J 21/00; G06F 3/017; G06F 3/0304; G06F 3/0308
See application file for complete search history.

(56) References Cited

U.S. PATENT DOCUMENTS

| 4,254,433 | A | 3/1981 | Dewar, Jr. et al. |
| 4,662,756 | A | 5/1987 | Duran, Jr. |

(Continued)

FOREIGN PATENT DOCUMENTS

| CN | 101558372 A | 10/2009 |
| CN | 101617271 A | 12/2009 |

(Continued)

OTHER PUBLICATIONS

CN 201910132964.4 Office Action dated Nov. 30, 2021.
(Continued)

*Primary Examiner* — Sisay Yacob
(74) *Attorney, Agent, or Firm* — Fletcher Yoder, P.C.

(57) ABSTRACT

A system in accordance with present embodiments includes a source of electromagnetic radiation that operates to emit electromagnetic radiation into an active playing area. The system also includes a sensing device that operates to receive the electromagnetic radiation after being reflected from a retro-reflective material of an article positioned in the active playing area and operable to generate data based on receiving reflected electromagnetic radiation from a series of article positions. Further, the system includes a controller that operates to process the data generated by the sensing device to determine whether the series of article positions correlate to a stored gesture and output a control signal to actuate an effect when the series of article positions correlate to the stored gesture.

17 Claims, 5 Drawing Sheets

Related U.S. Application Data continuation of application No. 16/533,530, filed on Aug. 6, 2019, now Pat. No. 10,699,557, which is a continuation of application No. 16/183,554, filed on Nov. 7, 2018, now Pat. No. 10,380,884, which is a continuation of application No. 14/184,591, filed on Feb. 19, 2014, now Pat. No. 10,134,267.

(60) Provisional application No. 61/768,200, filed on Feb. 22, 2013.

(51) Int. Cl.
*A63H 30/04* (2006.01)
*A63J 21/00* (2006.01)
*G06F 3/01* (2006.01)
*G06F 3/03* (2006.01)

(52) U.S. Cl.
CPC ............ *G06F 3/017* (2013.01); *G06F 3/0304* (2013.01); *G06F 3/0308* (2013.01)

(56) References Cited

U.S. PATENT DOCUMENTS

| | | | |
|---|---|---|---|
| 5,682,331 A | 10/1997 | Berlin | |
| 6,031,519 A * | 2/2000 | O'Brien | G06F 3/0482 345/157 |
| 6,176,837 B1 | 1/2001 | Foxlin | |
| 6,474,159 B1 | 11/2002 | Foxlin et al. | |
| 6,665,079 B1 | 12/2003 | Tocci et al. | |
| 6,665,985 B1 | 12/2003 | Hennes | |
| 6,761,637 B2 | 7/2004 | Weston et al. | |
| 6,784,826 B2 | 8/2004 | Kane et al. | |
| 6,796,908 B2 * | 9/2004 | Weston | A63G 7/00 472/60 |
| 6,831,603 B2 | 12/2004 | Menache | |
| 6,967,566 B2 | 11/2005 | Weston et al. | |
| 7,089,148 B1 | 8/2006 | Bachmann et al. | |
| 7,184,022 B2 | 2/2007 | Xie et al. | |
| 7,257,237 B1 | 8/2007 | Luck et al. | |
| 7,307,617 B2 | 12/2007 | Wilson et al. | |
| 7,356,172 B2 | 4/2008 | Fan et al. | |
| 7,395,181 B2 | 7/2008 | Foxlin | |
| 7,445,550 B2 | 11/2008 | Barney et al. | |
| 7,500,917 B2 | 3/2009 | Barney et al. | |
| 7,502,126 B2 | 3/2009 | Ong | |
| 7,505,033 B2 | 3/2009 | Guo et al. | |
| 7,519,537 B2 | 4/2009 | Rosenberg | |
| 7,618,323 B2 | 11/2009 | Rothschild et al. | |
| 7,623,115 B2 | 11/2009 | Marks | |
| 7,704,135 B2 | 4/2010 | Harrison, Jr. | |
| 7,755,608 B2 | 7/2010 | Chang et al. | |
| 7,775,439 B2 | 8/2010 | Kimber et al. | |
| 7,834,846 B1 | 11/2010 | Bell | |
| 7,850,527 B2 | 12/2010 | Barney et al. | |
| 7,854,655 B2 | 12/2010 | Mao et al. | |
| 7,863,551 B2 | 1/2011 | Bang et al. | |
| 7,874,918 B2 | 1/2011 | Osnato et al. | |
| 7,896,742 B2 | 3/2011 | Weston et al. | |
| 7,905,769 B1 | 3/2011 | Harrison, Jr. | |
| 7,918,733 B2 | 4/2011 | Zalewski et al. | |
| 7,927,216 B2 | 4/2011 | Ikeda et al. | |
| 7,996,793 B2 | 8/2011 | Atta et al. | |
| 8,058,975 B2 | 11/2011 | Barnardo et al. | |
| 8,068,641 B1 | 11/2011 | Hildreth | |
| 8,248,367 B1 | 8/2012 | Barney et al. | |
| 8,565,535 B2 | 10/2013 | Shamaie | |
| 8,698,743 B2 * | 4/2014 | Yabe | G06F 3/04855 345/157 |
| 8,773,512 B1 * | 7/2014 | Rafii | A63F 13/213 375/240.23 |
| 8,784,203 B2 | 7/2014 | Zalewski | |
| 9,176,608 B1 * | 11/2015 | Baldwin | G09G 5/00 |
| 9,536,163 B2 * | 1/2017 | Veeser | G06F 3/0325 |
| 10,134,267 B2 | 11/2018 | Kawash et al. | |
| 2003/0069077 A1 | 4/2003 | Korienek | |
| 2003/0090593 A1 * | 5/2003 | Xiong | H04N 23/6811 382/254 |
| 2003/0106455 A1 | 6/2003 | Weston | |
| 2004/0166937 A1 | 8/2004 | Rothschild et al. | |
| 2005/0143173 A1 | 6/2005 | Barney et al. | |
| 2005/0271280 A1 * | 12/2005 | Farmer | G06V 40/10 382/104 |
| 2006/0030385 A1 | 2/2006 | Barney et al. | |
| 2006/0154726 A1 | 7/2006 | Weston et al. | |
| 2006/0256081 A1 | 11/2006 | Zalewski et al. | |
| 2006/0282873 A1 | 12/2006 | Zalewski et al. | |
| 2006/0287087 A1 | 12/2006 | Zalewski et al. | |
| 2007/0259594 A1 | 11/2007 | Galbiati et al. | |
| 2007/0265075 A1 | 11/2007 | Zalewski | |
| 2008/0006762 A1 | 1/2008 | Fadell et al. | |
| 2008/0013826 A1 | 1/2008 | Hillis et al. | |
| 2008/0014835 A1 | 1/2008 | Weston et al. | |
| 2008/0096654 A1 | 4/2008 | Mondesir et al. | |
| 2008/0189046 A1 | 8/2008 | Eliasson et al. | |
| 2008/0244468 A1 | 10/2008 | Nishihara et al. | |
| 2009/0051653 A1 | 2/2009 | Barney et al. | |
| 2009/0115721 A1 | 5/2009 | Aull et al. | |
| 2009/0116730 A1 | 5/2009 | Cheng et al. | |
| 2009/0121894 A1 | 5/2009 | Wilson et al. | |
| 2009/0124165 A1 | 5/2009 | Weston | |
| 2009/0191968 A1 | 7/2009 | Johnson et al. | |
| 2009/0215534 A1 | 8/2009 | Wilson et al. | |
| 2009/0222149 A1 | 9/2009 | Murray et al. | |
| 2009/0234666 A1 | 9/2009 | Crawford et al. | |
| 2009/0296991 A1 * | 12/2009 | Anzola | G06F 3/0325 713/400 |
| 2009/0316952 A1 | 12/2009 | Ferren et al. | |
| 2010/0040292 A1 | 2/2010 | Clarkson | |
| 2010/0050133 A1 | 2/2010 | Nishihara et al. | |
| 2010/0091112 A1 | 4/2010 | Veeser et al. | |
| 2010/0134308 A1 | 6/2010 | Barnardo et al. | |
| 2010/0150399 A1 * | 6/2010 | Svajda | G06V 10/141 382/103 |
| 2010/0194762 A1 | 8/2010 | Latta et al. | |
| 2010/0199228 A1 | 8/2010 | Latta et al. | |
| 2010/0199230 A1 | 8/2010 | Latta et al. | |
| 2010/0281436 A1 | 11/2010 | Kipman et al. | |
| 2010/0292007 A1 | 11/2010 | Rabin et al. | |
| 2010/0295773 A1 * | 11/2010 | Alameh | G06F 3/0304 715/863 |
| 2010/0304868 A1 | 12/2010 | Zalewski | |
| 2010/0306712 A1 | 12/2010 | Snook et al. | |
| 2010/0306714 A1 | 12/2010 | Latta et al. | |
| 2010/0306715 A1 | 12/2010 | Geisner et al. | |
| 2010/0306716 A1 | 12/2010 | Perez | |
| 2011/0081970 A1 | 4/2011 | Barney et al. | |
| 2011/0118021 A1 | 5/2011 | Zalewski et al. | |
| 2011/0151974 A1 | 6/2011 | Deaguero | |
| 2011/0183751 A1 | 7/2011 | Ueshima | |
| 2011/0211073 A1 | 9/2011 | Foster | |
| 2011/0221947 A1 | 9/2011 | Awazu | |
| 2011/0260033 A1 * | 10/2011 | Steffensen | G06F 3/0304 250/203.1 |
| 2012/0040755 A1 | 2/2012 | Pryor | |
| 2012/0262366 A1 | 10/2012 | Zhu et al. | |
| 2012/0278720 A1 | 11/2012 | Yabe et al. | |

FOREIGN PATENT DOCUMENTS

| | | |
|---|---|---|
| CN | 101651804 A | 2/2010 |
| CN | 102124423 A | 7/2011 |
| CN | 102165396 A | 8/2011 |
| CN | 102439538 A | 5/2012 |
| CN | 102711935 A | 10/2012 |
| CN | 102906594 A | 1/2013 |
| JP | 2007052817 | 3/2007 |
| JP | 2008049117 A | 3/2008 |
| KR | 20100068222 A | 6/2010 |
| RU | 2109269 C1 | 4/1998 |
| WO | 2006031865 A2 | 3/2006 |
| WO | 2009053970 A1 | 4/2009 |

(56) References Cited

FOREIGN PATENT DOCUMENTS

| WO | 2012164345 A1 | 12/2012 |
| WO | 2012178202 A1 | 12/2012 |
| WO | 2013081632 A1 | 6/2013 |

OTHER PUBLICATIONS

Inazawa, Shinji et al., "Electromagnetic Wave Absorbent Characteristic of the Resin Sheet Dispersed Electroless Nife Magnetic Powder", Journal of The Surface Finishing Society of Japan, 2007, vol. 58, No. 3, pp. 196-199.

Su, Fagang et al., "Study on the Relationship between Surface Morphology and Absorptivity of Optical Radiation Absorbing Materials", ActaPhysica Sinica, 2011, vol. 60, No. 5, pp. 731-738.

KR Office Action for Korean Application No. 2023-7021045 mailed Oct. 20, 2023.

* cited by examiner

SYSTEM AND METHOD FOR TRACKING A PASSIVE WAND AND ACTUATING AN EFFECT BASED ON A DETECTED WAND PATH

This application is a continuation of U.S. patent application Ser. No. 16/915,955, filed Jun. 29, 2020, entitled "System and Method for Tracking a Passive Wand and Actuating an Effect Based on a Detected Wand Path," which is a continuation of U.S. patent application Ser. No. 16/533,530, filed Aug. 6, 2019, entitled "System and Method for Tracking a Passive Wand and Actuating an Effect Based on a Detected Wand Path," which is a continuation of U.S. patent application Ser. No. 16/183,554, filed Nov. 7, 2018, entitled "System and Method for Tracking a Passive Wand and Actuating an Effect Based on a Detected Wand Path," which is a continuation of U.S. patent application Ser. No. 14/184,591, filed Feb. 19, 2014, entitled "System and Method for Tracking a Passive Wand and Actuating an Effect Based on a Detected Wand Path," which claims the benefit of U.S. Provisional Application No. 61/768,200, filed Feb. 22, 2013, entitled "System and Method for Tracking a Passive Wand and Actuating an Effect Based on a Detected Wand Path," which are incorporated by reference in their entireties.

FIELD OF DISCLOSURE

The present disclosure relates generally to the field of amusement parks. More specifically, embodiments of the present disclosure relate to methods and equipment utilized to entertain guests by generating effects based on detected wand movement.

BACKGROUND

Since the early twentieth century, amusement parks (or theme parks) have substantially grown in popularity. Accordingly, there has been an increased demand and an accompanying increase in competition with respect to amusement parks. It is therefore desirable to add more entertaining and larger numbers of attractions to amusement parks. The addition of large attractions, such as rides and shows, generally provides an amusement park with additional capacity to handle a larger number of guests. However, such attractions tend to draw more visitors and become hubs for guest traffic. Further, the addition of traditional rides without an added layer of intrigue may be insufficient to garner sufficient guest interest to address either guest traffic issues or provide an advantage over competitors. Accordingly, it is now recognized that systems and methods that facilitate distribution of guest traffic and/or provide increased levels of entertainment value are desireable.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In accordance with one embodiment, a system includes a source of electromagnetic radiation configured to emit electromagnetic radiation into an active playing area. The system also includes a sensing device configured to receive the electromagnetic radiation after being reflected from a retro-reflective material of an article positioned in the active playing area and configured to generate data based on receiving reflected electromagnetic radiation from a series of article positions. Further, the system includes a controller configured to process the data generated by the sensing device to determine whether the series of article positions correlate to a stored gesture and output a control signal to actuate an effect when the series of article positions correlate to the stored gesture.

In another embodiment, a method includes emitting electromagnetic radiation into an active playing area from an emitter. The method also includes receiving the electromagnetic radiation at a sensing device after the electromagnetic radiation has been reflected from a retro-reflective material of an article positioned in the active playing area. Further, the method includes generating data with the sensing device based on receiving reflected electromagnetic radiation from a series of article positions, and processing the data generated by the sensing device with a controller to determine whether the series of article positions correlate to a stored gesture and outputting a control signal from the controller when the series of article positions correlate to the stored gesture.

In another embodiment, a system includes an electromagnetic radiation emitter and a sensing device configured to receive the electromagnetic radiation after being reflected from a retro-reflective material of an article positioned in the active playing area and configured to generate data based on receiving reflected electromagnetic radiation from a series of article positions. Further, the system includes a controller and a processing engine of the controller. Additionally, the system includes a feature extraction module of the processing engine configured to extract relevant data from the data generated by the sensing device, and a gesture recognition module of the processing engine configured to analyze the relevant data to determine whether the series of article positions correspond to a known gesture.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

It has now been recognized that it is desirable to provide small interactive attractions throughout an amusement park that economically entertain the guests while also diverting traffic from major attractions. It has also been recognized that all attractions, whether large or small, may benefit from an interactive component or layer. Accordingly, present embodiments are directed to a passive article tracking system that is capable of tracking movement of a passive article (e.g., wand) and actuating certain effects based on an identified article or wand path corresponding to a defined gesture.

The disclosed wand tracking system may be implemented as or with amusement park attractions including shows, restaurants, rides, shops, and so forth. Present embodiments enable implementation in outdoor and indoor environments, which facilitates implementation in a variety of scenarios. Further, present embodiments include economical and theme-oriented components and characteristics of operation. For example, an actuation tool in accordance with present embodiments includes a passive wand, which has no actively functioning components (e.g., no light emitting diodes, gyroscopes, or radio frequency identification transmitter). This serves to keep the operational aspects of the wand a mystery, which is in keeping with a magical theme and also makes the wand more economical. For example, the passive wand does not include electronics or require batteries, which adds intrigue with respect to its operation while, more practically, saving expenses associated with including electronic components and batteries. By employing the passive wand detection system as an attraction or along with an attraction in an amusement park, guests are incentivized to visit the amusement park and are further enabled to immerse themselves in the thematic experience provided by the amusement park.

Figure 1:
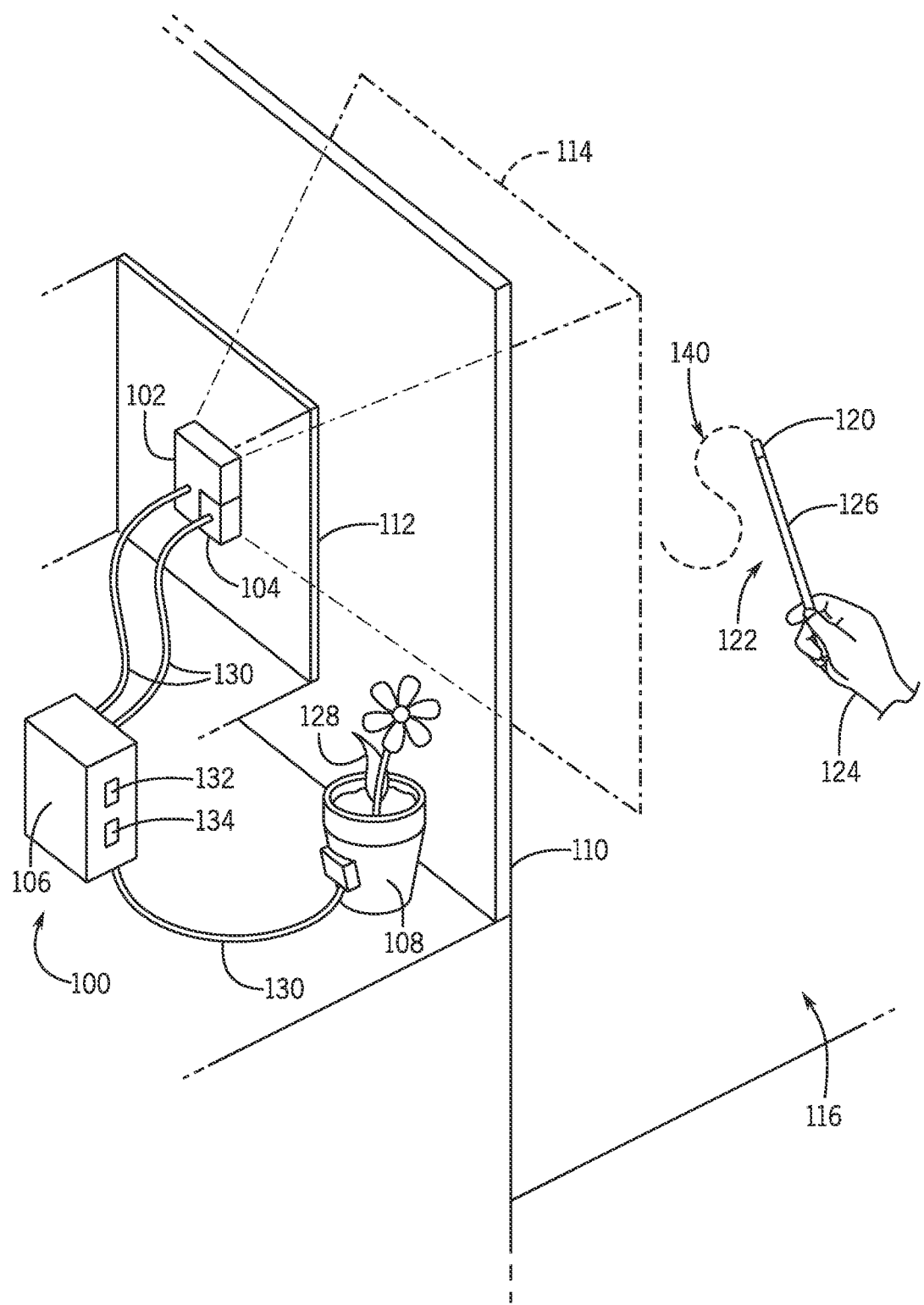
FIG. 1 is a perspective view of an amusement park attraction including a passive wand tracking system in accordance with present techniques.

FIG. 1 is a perspective view of a system 100 in accordance with present embodiments. The system 100 may incorporate material and functional features such as disclosed in U.S. Pat. No. 6,665,079, which is hereby incorporated by reference. The system 100 is designed to detect relative positioning of an illuminated component having a properly correlated retro-reflective material and to utilize the relative positioning to identify whether a correlation exists between predefined gestures and a path traced by the illuminated component. If a proper correlation is found to exist, the system is capable of actuating an effect (e.g., activate a motor, ignite a flame, or open a valve) to provide entertainment to amusement park guests. In one embodiment, if a proper correlation is found, an output may be provided to a computer, display, or monitoring device. Specifically, the system 100 includes an emitter 102, a sensing device 104, a controller 106, and an effect device 108. In the illustrated embodiment, the system 100 is completely disposed behind a window 110 and components of the system are hidden from view through the window by camouflaging material 112 (e.g., mirrored glass, netting, or textured plastic) to make the system invisible to participants. However, different arrangements of components of the system 100 and implementations in different environments are included in the present disclosure.

The emitter 102 operates to emit electromagnetic radiation, which is represented by an expanding light beam 114 for illustrative purposes, to bathe or flood an active playing area 116 in the electromagnetic radiation. The light beam 114 may be representative of multiple light beams being emitted from different sources. Further, the light beam 114 is emitted at a frequency that has a correspondence to a material defining a retro-reflective tip 120 on a wand 122 that is being wielded by a guest 124. The retro-reflective tip 120 may include a coating of retro-reflective material disposed on a body 126 of the wand 122 or a solid piece of material coupled with the body 126 of the wand 122. The retro-reflective tip 120 may coordinate with the light beam 114 to reflect electromagnetic radiation back towards the sensing device 104 to facilitate identification of a location of the retro-reflective tip 120 by the system 100. This location information (obtained based on the reflected electromagnetic radiation) may then be utilized by the controller 106 to determine whether the effect device 108 or a component of the effect device should be actuated, such as causing a fake flower 128 of the effect device 108 to move. It should be noted that, in some embodiment, the retro-reflective material may be positioned at different locations on the wand 122 other than the tip. Further, in some embodiments, the light beam 114 represents a limited number of light beams or light emissions (provided in series or simultaneously) that are used to identify the position of the wand 122, which may be facilitated by the retro-reflective tip 120. Indeed, the retro-reflective tip may operate or be designed to always or essentially always return radiation (e.g., light) to its source.

Specifically, in operation, the sensing device 104 of the system 100 may function to detect the light beam 114 bouncing off of the retro-reflective tip 120 and provide data associated with detection to the controller 104 via cables 130 for processing. It should be noted that while in the illustrated embodiment the various components of the system 100 are communicatively coupled with electric cabling 130, in other embodiments the components may communicate wirelessly. Once the controller 106 receives the data from the sensing device 104, the controller 106 may utilize a processor 132 and/or a memory 134 to determine a location of the retro-reflective tip 120. Indeed, the controller 106 may employ known visual boundaries or an established orientation of the sensing device 104 to identify a location (e.g., coordinates) corresponding to the detected retro-reflective tip 120.

Figure 2:
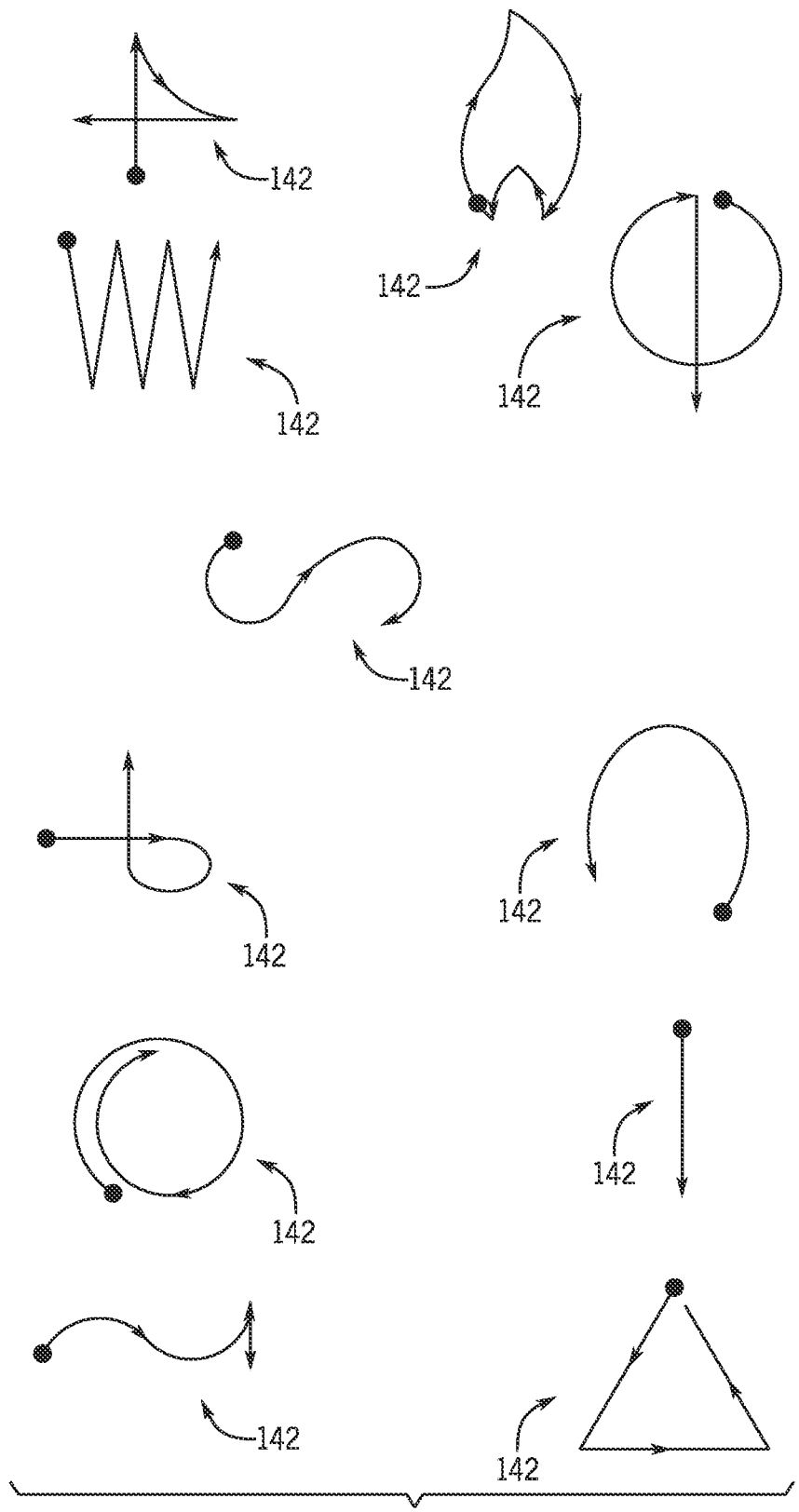
FIG. 2 is a representation of reference wand paths or gestures that may be stored in a passive wand tracking system and utilized to determine whether a particular output should be generated based on a detected wand path or gesture in accordance with present embodiments.

The process of emitting the light beam 114, sensing of the reflected light from the retro-reflective tip 120, and determining a location of the retro-reflective tip 120 may be performed by the controller 100 numerous times over a short period in order to identify a series of locations of the retro-reflective tip 120. Indeed, such procedures may essentially be performed continuously to facilitate identification of a path 140 through which the retro-reflective tip 120 has moved within the active playing area 116 during a particular timeframe or simply in continuous series. Once the path 140 has been detected, a determination is made by the controller 106 as to whether the path 140 properly correlates to a pattern or gesture identified by the system 100 as corresponding to actuation of the effect device 108. For example, the system 100 may perform a comparison of the path or identified path 140 with stored paths 142 (such as illustrated in FIG. 2) to determine whether one or more actions should be performed by the effect device 108. For example, if the identified path 140 correlates to a particular one of the stored paths 142, the controller 106 may actuate the effect device 108 such that the flower 128 is made to move. This gives the illusion that a guest properly performing a wand movement is magically causing the flower to move or grow. It should be noted that a correspondence between the identified path 140 and particular stored paths 142 may result is different types of actuation (e.g., a first wand movement may cause the flower to appear to shrink and a second wand movement may cause the flower to appear to grow). It should be noted that some embodiments may perform interpolation between identified positions as a component of identifying the path 140.

Figure 3:
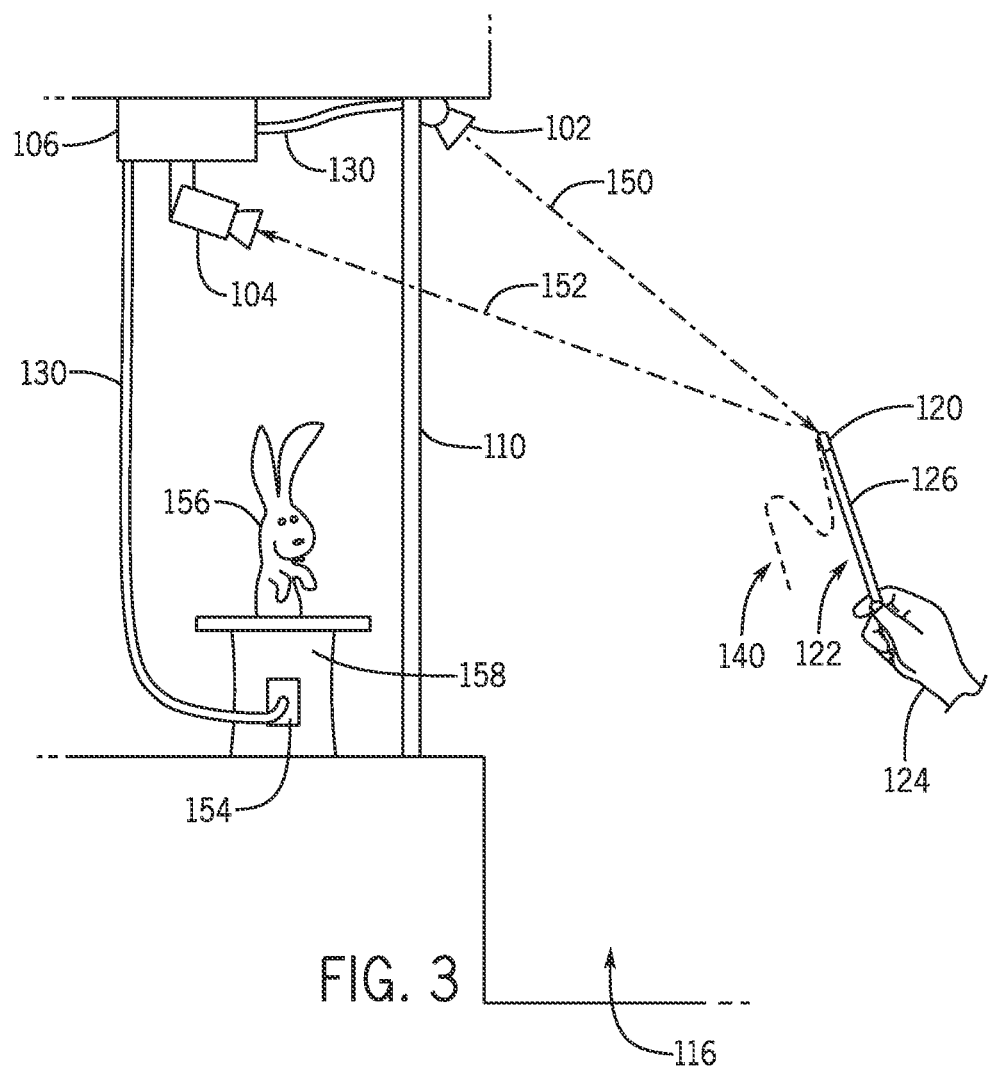
FIG. 3 is a side view of an amusement park attraction including a passive wand tracking system in accordance with present techniques.

In the embodiment illustrated by FIG. 1, the emitter 102 and the sensor or sensing device 104 are integral features such that a plane of operation associated with the sensing device 104 is essentially overlapping with a plane of operation associated with the emitter 102. However, the sensing device 104 (e.g., an infrared camera) may be positioned in a different location with respect to the emitter 102, which may include an infrared light bulb. For example, as illustrated in FIG. 3, the emitter 102 and sensing device 104 are separate and positioned in different locations. Specifically, the emitter 102 of FIG. 3 is positioned outside of the window 110 of a storefront containing other components of the system 100. The sensing device 104 of FIG. 3 is positioned away from the emitter 102 but still oriented to detect light reflected from the retro-reflective tip 120 and originating from the emitter 102. For illustrative purposes, arrows 150, 152 represent a light beam being emitted from the emitter into the active playing area 116, reflected by the retro-reflective tip 120, and detected by the sensing device 104. The light beam represented by the arrow 150 is merely one of numerous light beams that flood or otherwise selectively illuminate the active playing area from the emitter 102.

As in FIG. 2, the system of FIG. 3 utilizes a series of detected emitter light reflections (e.g., 152) from the retro-reflective tip 120 to identify and/or track wand positioning. The sensing device 104 generates data based on the reflected electromagnetic radiation (e.g., 152) and a series of detections may correspond to the detected wand path 140. The controller 106 assembles this data and determines whether certain patterns were formed by the detected path 140 traced by the retro-reflective wand tip 120 during a certain timeframe or in a continuous series despite the timeframe. If certain known or stored patterns 142 correlate (e.g., match) with the detected path 140, the controller 106 may actuate the effect 108, such as activate a motor 154 to move a fake rabbit 156 out of a hat prop 158.

Figure 4:
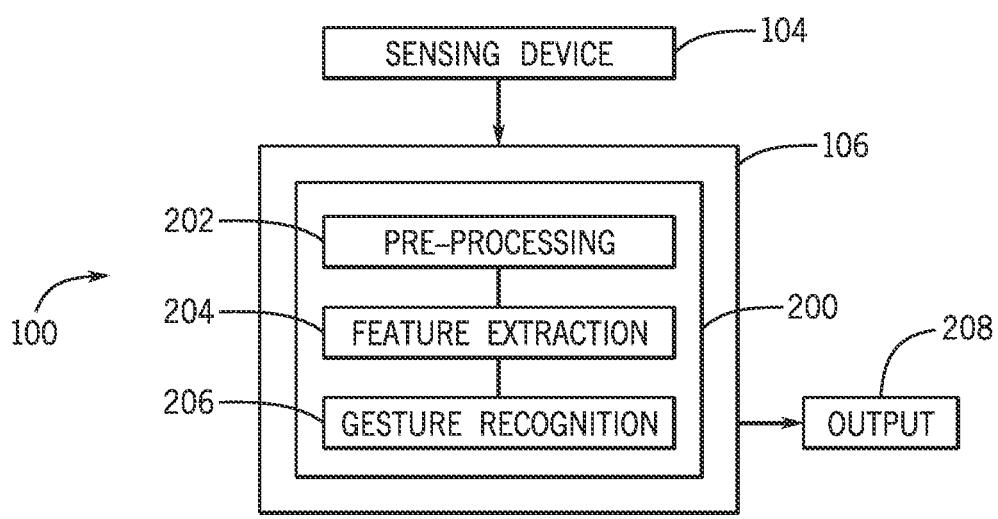
FIG. 4 is a block diagram of a passive wand tracking system in accordance with present techniques.
Figure 5:
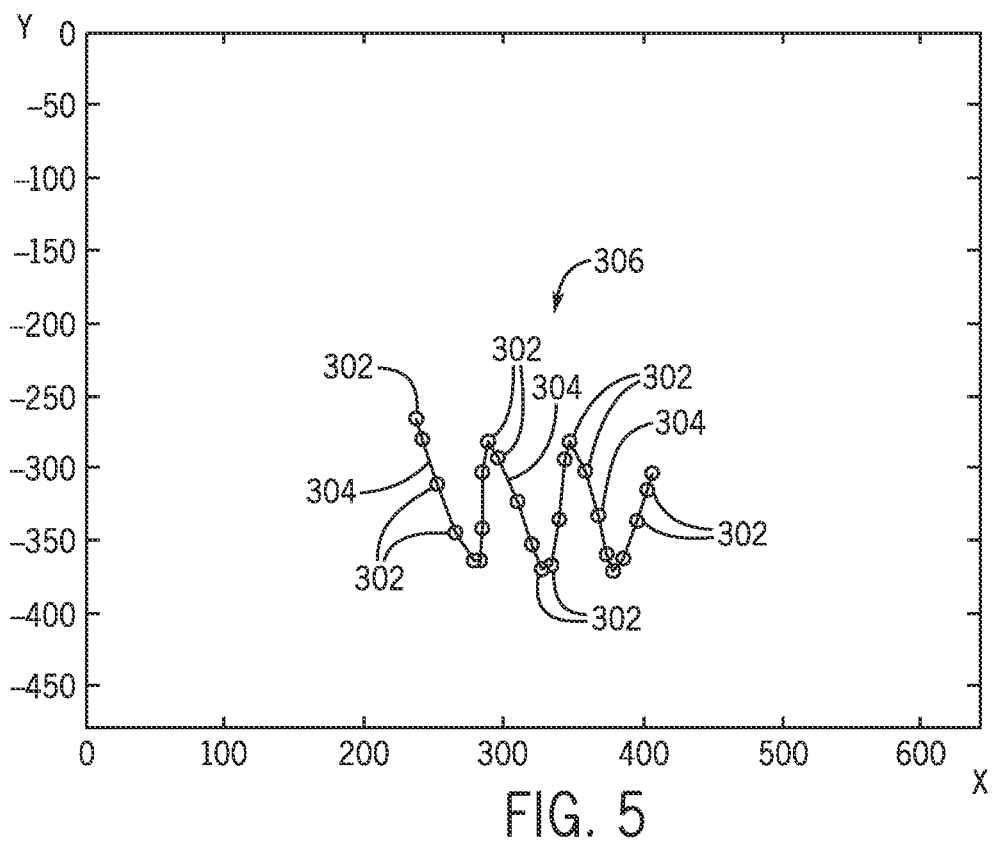
FIG. 5 is a plot of detected positions of a passive wand and an interpolated path defined by a passive wand tracking system in accordance with present embodiments.

FIG. 4 illustrates a block diagram of the system 100 and certain details of a processing engine 200 of the controller 106 in accordance with present embodiments. The system 100 performs data acquisition with the detector or sensing device 104 and then the controller 106 utilizes the data to classify gestures or movement paths of the retro-reflective wand tip 120. Specifically, the processing engine 200 may perform certain pre-processing tasks on data received from the sensing device 104 with a pre-processing module 202. This pre-processing module 202 may function to facilitate robust performance when operating in various different light conditions (e.g., the active playing area 116 is in broad daylight). Next, a feature extraction module 204 may function to extract certain features from the data acquired from the sensing device 104 and pre-processed by the pre-processing module 202. This extraction of features may include determining wand positions within a frame, tracking multiple wands (e.g., identify and track ten different wand gestures simultaneously), identifying gesture temporal segmentation with motion trajectories between static wand positions considered to be potential gestures, and trajectory interpolation. For example, FIG. 5 illustrates a plot of detected locations 302 of the retro-reflective wand tip within a frame and interpolations 304 between the detected locations 302. The detected locations 302 and interpolation 304 cooperate to form a pattern 306, which is essentially the detected wand path 140. This detected wand path 140 is then analyzed by a gesture recognition module 206 to determine whether the detected wand path 140 correlates to a stored wand path 142. If there is sufficient correspondence between the detected wand path 140 and a one of the stored wand paths 142, the processing engine 200 or controller 106 will actuate an associated output 208. This may include directly activating an effect device 108 or instructing a separate controller (e.g., a programmable logic controller) to perform the task. It should be noted that the controller 106 may include a computer or any of various different industrial automation controllers.

Figure 6:
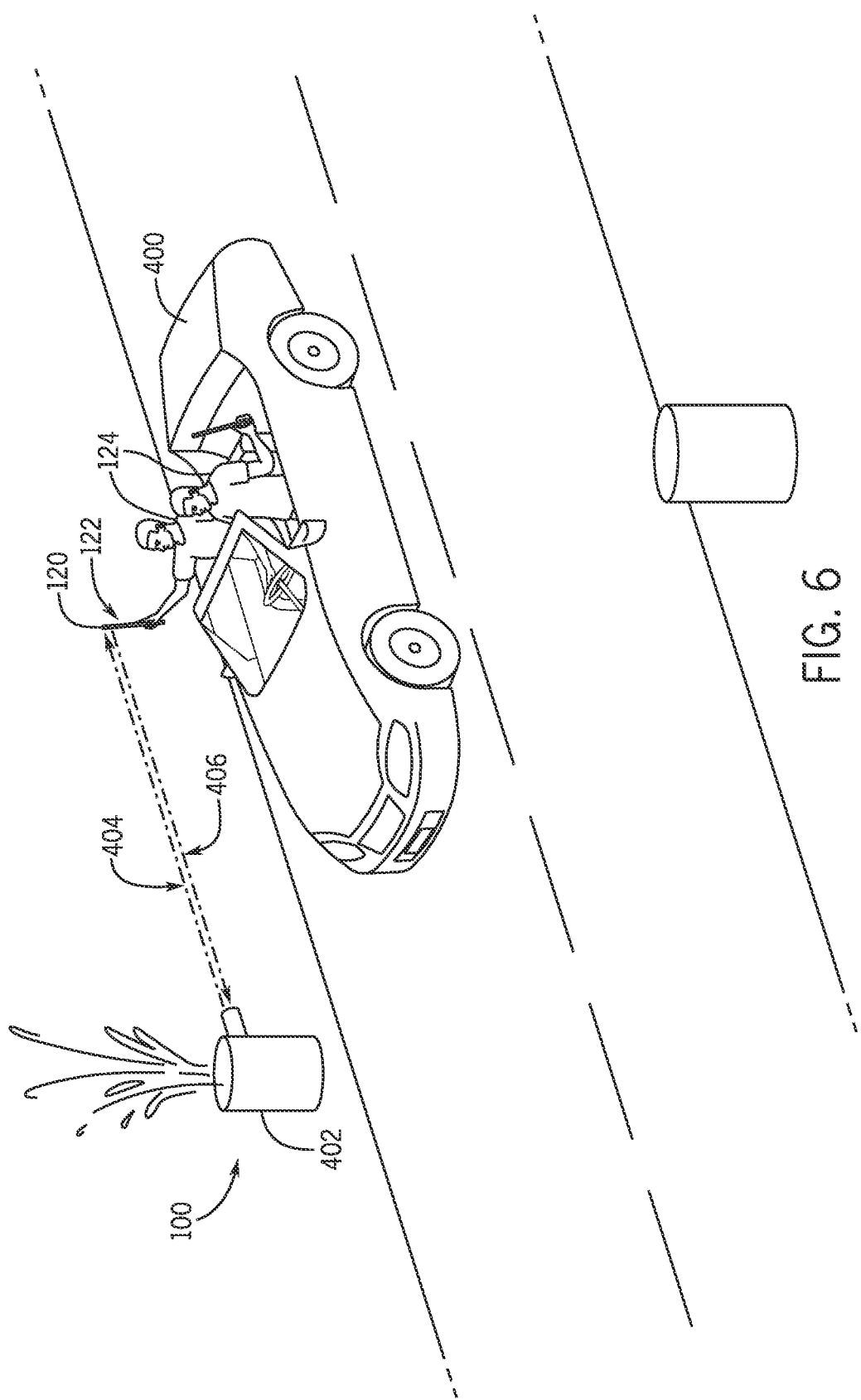
FIG. 6 is a perspective view of an amusement park attraction including a ride system in coordination with a passive wand tracking system in accordance with present embodiments.

Present embodiments include a wand-based gesture recognition system and method for use in an amusement park. In particular, the embodiments illustrated in FIGS. 1 and 2 are generally representative of implementations in a storefront environment. However, in other embodiments, the system 100 may be employed to add a layer of entertainment to other entertainment features. For example, as illustrated in FIG. 6, the system 100 may be employed in conjunction with a ride to add to guest enjoyment and immersion in the ride environment. Specifically, for example, FIG. 6 illustrates guests 124 on a ride vehicle 400 utilizing the system 100 to actuate activation of a water fountain 402 integrated in the ride environment. As described above, the system is projecting light 404 and receiving reflected light 406 to identify gestures made with the wand 122 or, more precisely, the retro-reflective wand tip 120.

Present embodiments include the system being capable of detecting a passive wand with a retro-reflective material that allows a guest to manipulate the wand to control various effects when proper gestures are made within an active playing area. The system functions without any active features on the wand. That is, the wand does not include a gyroscope, light emitter, radio frequency transmitter, or any other functional component. This not only simplifies the system for users but also provides a cost benefit. Further, present embodiments enable operation in a wide range of lighting conditions (including broad daylight), whereas traditional gesture recognition technologies do not function well in broad daylight due to interference from electromagnetic radiation from the sun. Present embodiments allow an amusement park to add small venues for guest entertainment and diversify other attractions.

Certain operational characteristics and feature capabilities may be desirable for the system and related components. For example, the emitter and detector may be configured to operate specifically within a defined range. As a specific example, the active playing area may extend approximately 5-12 feet from the emitter and/or detector. Further, the retro-reflective material utilized for the retro-reflective wand tip may require certain characteristics such that only enabled devices are recognized by the system. Further, the retro-reflective material and the system may coordinate to increase tolerance of background noise. The system may be designed to include different tolerance levels with respect to identifying correspondence between the identified path and stored paths based on different retro-reflective materials to enable different difficulties for younger guests.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system comprising:
 a sensing device configured to receive reflected radiation from an article when the article is disposed at a plurality of positions in an area, wherein the article comprises a material designed to filter radiation wavelengths outside of a range to predominantly reflect radiation back to a source of radiation without reflecting other radiation having the radiation wavelengths outside of the range; and a controller comprising one or more processors configured to output a control signal to an effect device that generates an effect based on the plurality of positions correlating to a stored gesture.

2. The system of claim 1, wherein the reflected radiation includes radiation reflected from a retroreflective material of the article when the article is disposed at the plurality of positions.

3. The system of claim 1, comprising the article.

4. The system of claim 1, wherein the controller is configured to:
identify a retroreflective material associated with the article based on a frequency of the reflected radiation; and
determine whether the plurality of positions correlate to the stored gesture based on the identified retroreflective material.

5. The system of claim 1, wherein the reflected radiation comprises radiation being reflected from a solid component of the article or a coating on the article.

6. The system of claim 1, comprising the source of the reflected radiation.

7. The system of claim 1, wherein the controller is configured to interpolate between the plurality of positions at a plurality of times to facilitate determining whether the plurality of positions at the plurality of times correlate to the stored gesture.

8. A method, comprising:
receiving, via a sensing device, reflected radiation from an article when the article is disposed at a plurality of positions in an area;
identifying a frequency of the reflected radiation;
generating, via the sensing device, data based on the reflected radiation;
determining, via a controller, that the plurality of positions correlates to a stored gesture based on the data;
modifying, via the controller, a tolerance associated with determining whether the plurality of positions correlate to the stored gesture based on the frequency; and
outputting, via the controller, a control signal to actuate an effect device that generates an effect based the plurality of positions correlating to the stored gesture.

9. The method of claim 8, comprising emitting radiation into the area via a source of radiation.

10. The method of claim 9, wherein the article is configured to reflect the radiation towards the source of the radiation.

11. The method of claim 8, comprising determining, via the controller, that the plurality of positions correlates to the stored gesture in response to determining that a timeframe corresponding the plurality of positions is less than a threshold timeframe.

12. A system, comprising:
a sensing device configured to receive reflected radiation from an article when the article is disposed at a plurality of positions in an area, wherein the article comprises a material designed to filter radiation wavelengths outside of a range to predominantly reflect radiation back to a source of radiation without reflecting other radiation having the radiation wavelengths outside of the range;
an effect device configured to generate a first effect, a second effect, or both; and
a controller comprising one or more processors and one or more tangible, non-transitory, computer-readable media storing instructions that, when executed by the one or more processors, cause the one or more processors to:
output a control signal to actuate the effect device to generate the first effect, the second effect, or both, based on the plurality of positions correlating to a first stored gesture of a plurality of stored gestures, a second stored gesture of the plurality of stored gestures, or both.

13. The system of claim 12, wherein the one or more processors are configured to:
identify the plurality of positions based on a frequency of the reflected radiation; and
determine whether the plurality of positions corresponds to the first stored gesture of the plurality of stored gestures, the second stored gesture of the plurality of stored gestures, or both.

14. The system of claim 12, wherein the reflected radiation includes radiation being reflected from a retroreflective material of the article when the article is disposed at the plurality of positions in the area.

15. The system of claim 12, wherein the reflected radiation comprises radiation being reflected from a solid component of the article or a coating on the article.

16. The system of claim 15, wherein the article is configured to reflect the radiation towards a source of radiation.

17. The system of claim 15, wherein the controller is configured to pre-process the received reflected radiation to remove interference received by the sensing device when the area is in broad daylight.

* * * * *